Patented Nov. 7, 1944

2,361,964

UNITED STATES PATENT OFFICE 2,361,964

LACTONES OF THE SATURATED AND UNSATURATED CYCLOPENTANOPOLYHYDROPHENANTHRENE SERIES AND PROCESS OF PREPARING SAME

Leopold Ruzicka, Zurich, and Tadeus Reichstein, Basel, Switzerland, assignors, by mesne assignments, to Ciba Pharmaceutical Products, Incorporated, Summit, N. J., a corporation of New Jersey No Drawing. Application September 19, 1939, Serial No. 295,696. In Switzerland September 15, 1938

3 Claims. (Cl. 260—239.5)

The aglycones of most vegetable cardiac poisons are derivatives of the cyclopentanopolyhydrophenanthrene-series which are characterised by a β.γ-unsaturated vinyl-acetic acid-lactone group as a side chain in 17-position as indicated in the following formula

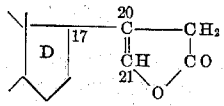

Hitherto no synthetic method for making derivatives of the cyclopentanopolyhydrophenanthrene series having the above characteristic lactone-group have been described. On account of their therapeutically valuable properties a suitable synthesis of these vegetable cardiac poisons has become of great importance.

This invention relates to the manufacture of lactones of the cyclopentanopolyhydrophenanthrene-series by condensing a derivative of a ketol of the general formula

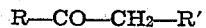

in which R is any substituted cyclopentanopolyhydrophenanthrene-residue and R' is a substituted, for instance esterified hydroxyl group with an ester of a halogen fatty acid and if desired subjecting the condensation product to a re-esterifying treatment and a treatment for splitting off water.

The following scheme indicates the probable course of the reaction:

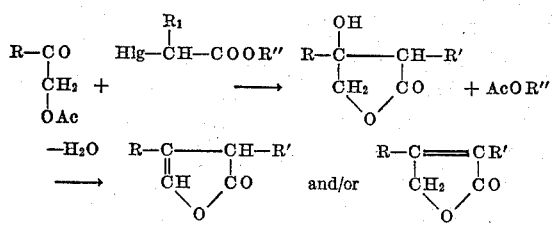

(R is any substituted cyclopentanopolyhydrophenanthrene-residue, R'=H or alkyl, R'' is alkyl).

The condensation may be effected in known manner by means of zinc or magnesium in a suitable inert solvent, for instance benzene, toluene or ether. Lactonisation generally occurs during the condensation and also frequently a partial elimination of water. When lactonisation begins only with difficulty re-esterification may be advantageous. One obtains therefore in many instances mixtures which may be separated into their constituents or further worked up as mixtures. Thus if desired the condensation product may be subjected to the known processes for eliminating water, of which distillation or sublimation under diminished pressure has proved especially useful, if desired after admixture with surface-active substances, for instance aluminium oxide, silica gel, active carbon, fuller's earth or with an anhydrous salt, for instance copper sulfate. The mixture produced of α.β- and β.γ-unsaturated lactones may be treated for isolating pure components in the usual manner, for instance by fractional crystallisation or by chromatographic adsorption analysis. The presence of a β.γ-unsaturated lactone may easily be detected positively by the color reaction with sodium nitro-prusside and some alkali in pyridine solution (legal test).

As parent materials there come into question the cyclopentanopolyhydrophenanthrene-derivatives which have the ketol side chain in 17-position, preferably those of the pregnane-, allopregnane- and pregnene-series, for instance 3:21 - diacetoxy - pregnanone-(20), 3:21-diacetoxy - allopregnanone-(20) and Δ⁵-3:21-diacetoxy-pregnenone-(20).

The following examples illustrate the invention:

Example 1

600 mgms. of 3:21-diacetoxy-allopregnanone-(20) of melting point 153–154° C. and of the formula

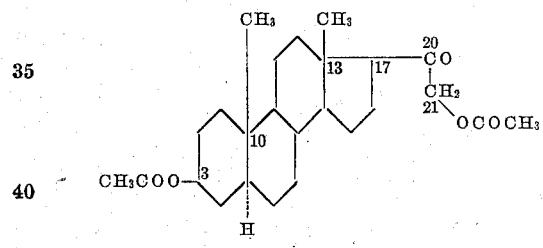

are dissolved in 5 cc. of absolute benzene and the solution is caused to react with 300 mgms. of ethylbromacetate and 120 mgms. of zinc. After heating on the water-bath for 2 hours the mass is decomposed with ice and dilute hydrochloric acid and the product dissolved in ether. The ethereal solution is washed with water and dilute bicarbonate solution and dried over anhydrous sodium sulfate and then evaporated. The residue is mixed with 6 grams of aluminium oxide and heated at 180° C. in a sublimation vessel under a pressure of 0.01 mm. until no further sublimate is produced. The sublimate is adsorbed in benzene solution on aluminium oxide and subdivided into a number of fractions by fractional elutriation by means of benzene, ether and acetone. The various fractions are tested by the legal test and those which give a positive colour reaction are separated from the rest. By fractional crystallisation from a mixture of ethylacetate and hexane the individual fractions can be further purified.

*Example 2*

2 grams of $\Delta^5$-3:21-diacetoxy-pregnene-20-one of melting point 170° C. are dissolved in 20 cc. of absolute benzene, the solution is mixed with 1.56 grams of zinc spangles and 4.24 grams of freshly distilled ethylbromacetate and the whole is boiled under reflux until the zinc has almost completely dissolved. The benzene solution is cautiously evaporated and the residue is mixed with absolute ethyl alcohol and the solution filtered from the zinc mud. The alcoholic solution is poured into ice-cold dilute hydrochloric acid and the precipitate is dissolved in ether. The alcoholic ether layer is washed with much water, whereby the main quantity of the product is separated in the form of a white powder which is filtered. This product is relatively sparingly soluble in ether but can be purified by crystallisation from glacial acetic acid and absolute alcohol. It then melts at 239° C. and is $\Delta^5$-3-acetoxy-20:21-dihydroxy-norcholenic acid-lactone of the formula

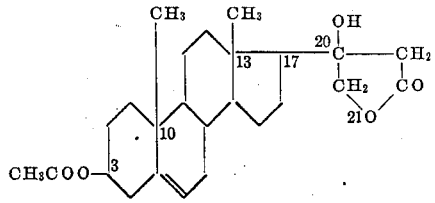

The elimination of water to produce the corresponding unsaturated lactone may be effected by heating at 240° C. in a vacuum. The reaction is similar when other halogen fatty acid esters are used, for instance ethyl-$\alpha$- or -$\beta$-bromopropionate.

Instead of from 10:13-dimethyl-cyclopentanopolyhydrophenanthrene compounds one may also start from cyclopentanopolyhydrophenanthrene compounds containing no methyl group or only one methyl group, for instance in 13-position.

What we claim is:

1. A compound of the formula:

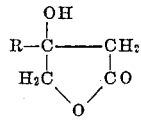

in which R is an organic radical containing a carbon atom directly attached to the —OH substituted carbon atom of the lactone ring.

2. A compound of the formula:

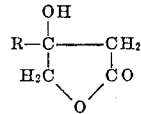

in which R is a carbocyclic radical having a carbocyclic carbon atom directly attached to the —OH substituted carbon atom of the lactone ring.

3. The process of producing $\beta$-substituted unsaturated $\gamma$ butyrolactones in which a $\beta$-substituted $\beta$-hydroxy saturated $\gamma$ butyrolactone is subjected to dehydration conditions to remove the hydroxy group and an H atom attached to an adjacent C atom of the ring.

LEOPOLD RUZICKA.
TADEUS REICHSTEIN.